United States Patent Office 3,836,687
Patented Sept. 17, 1974

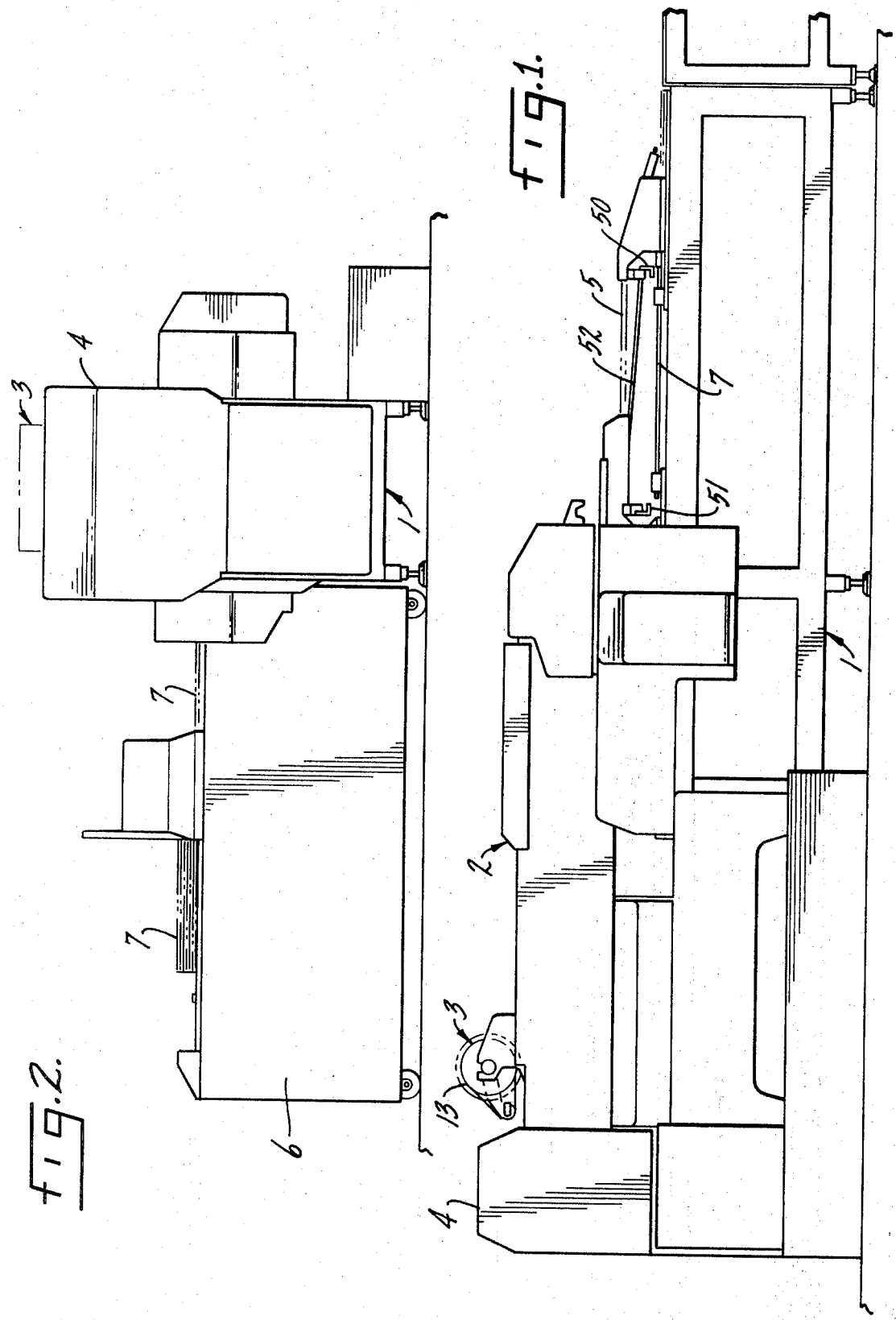

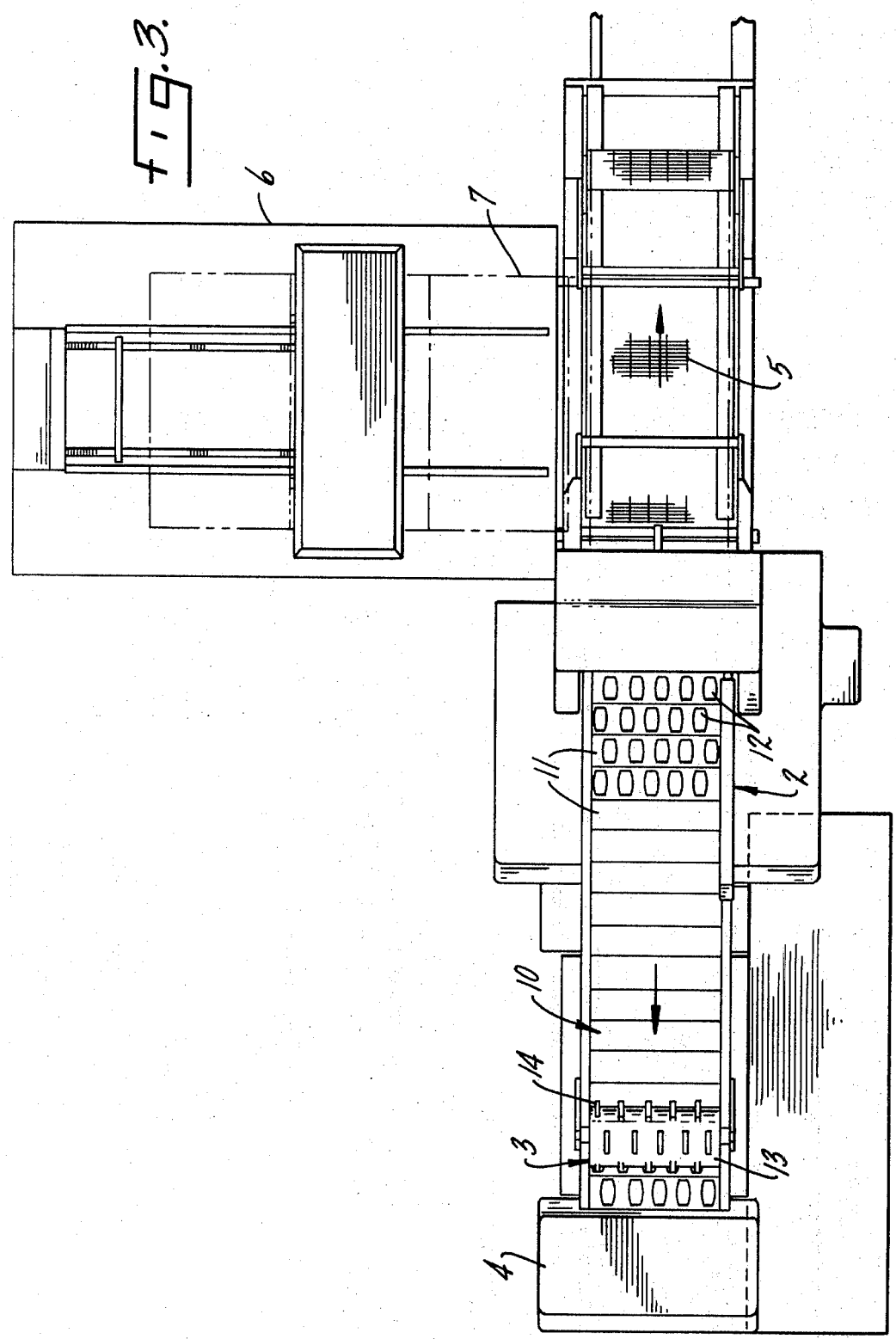

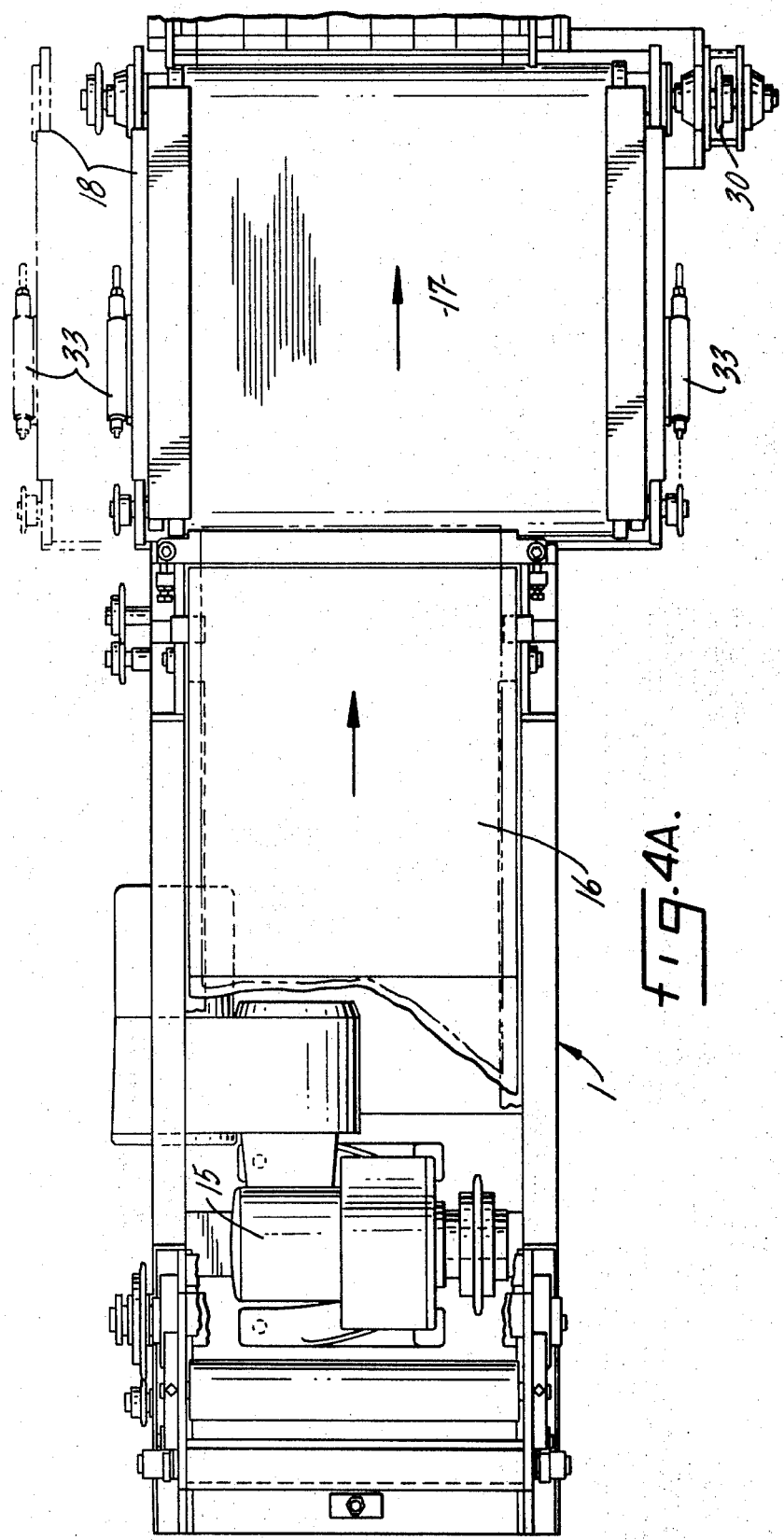

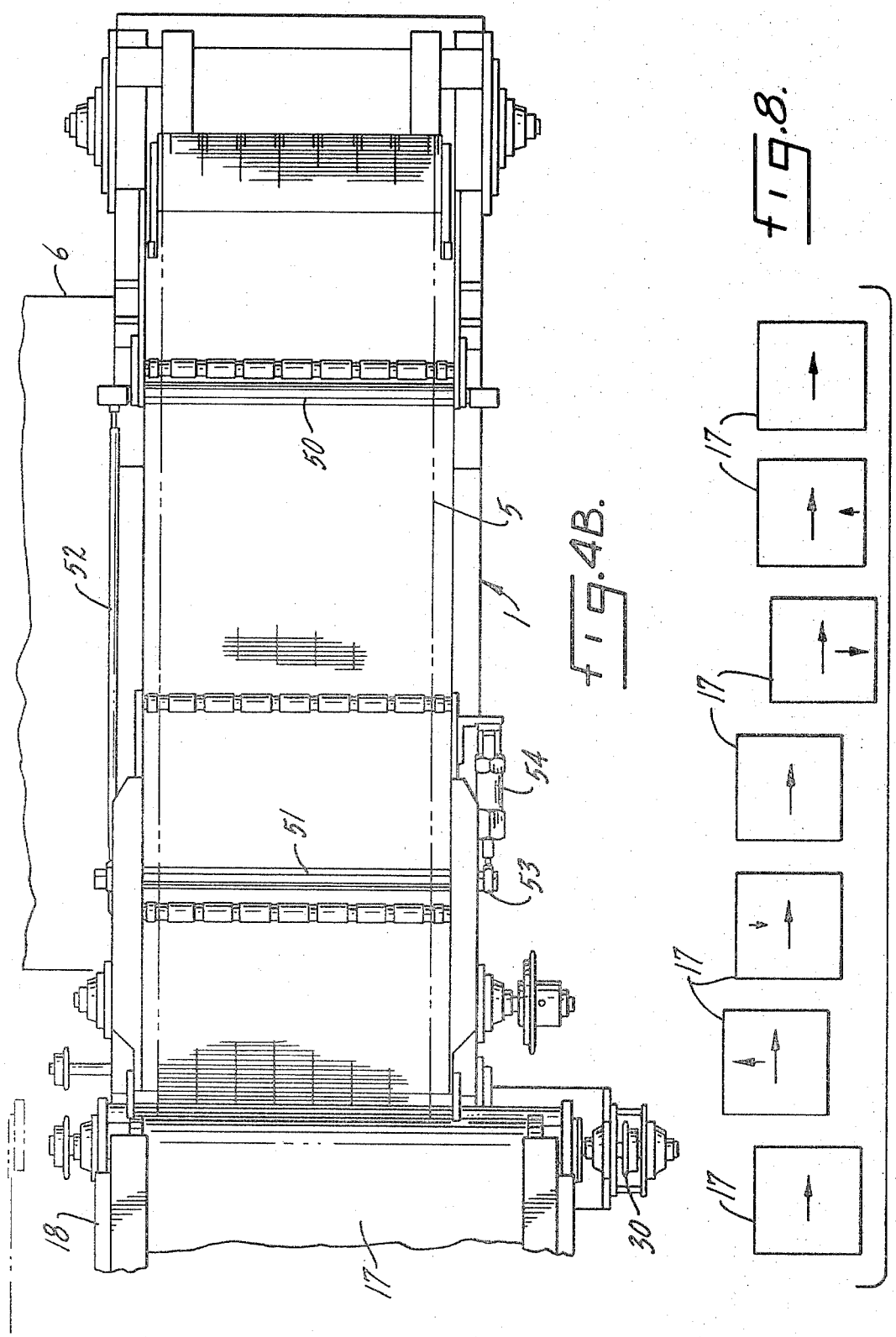

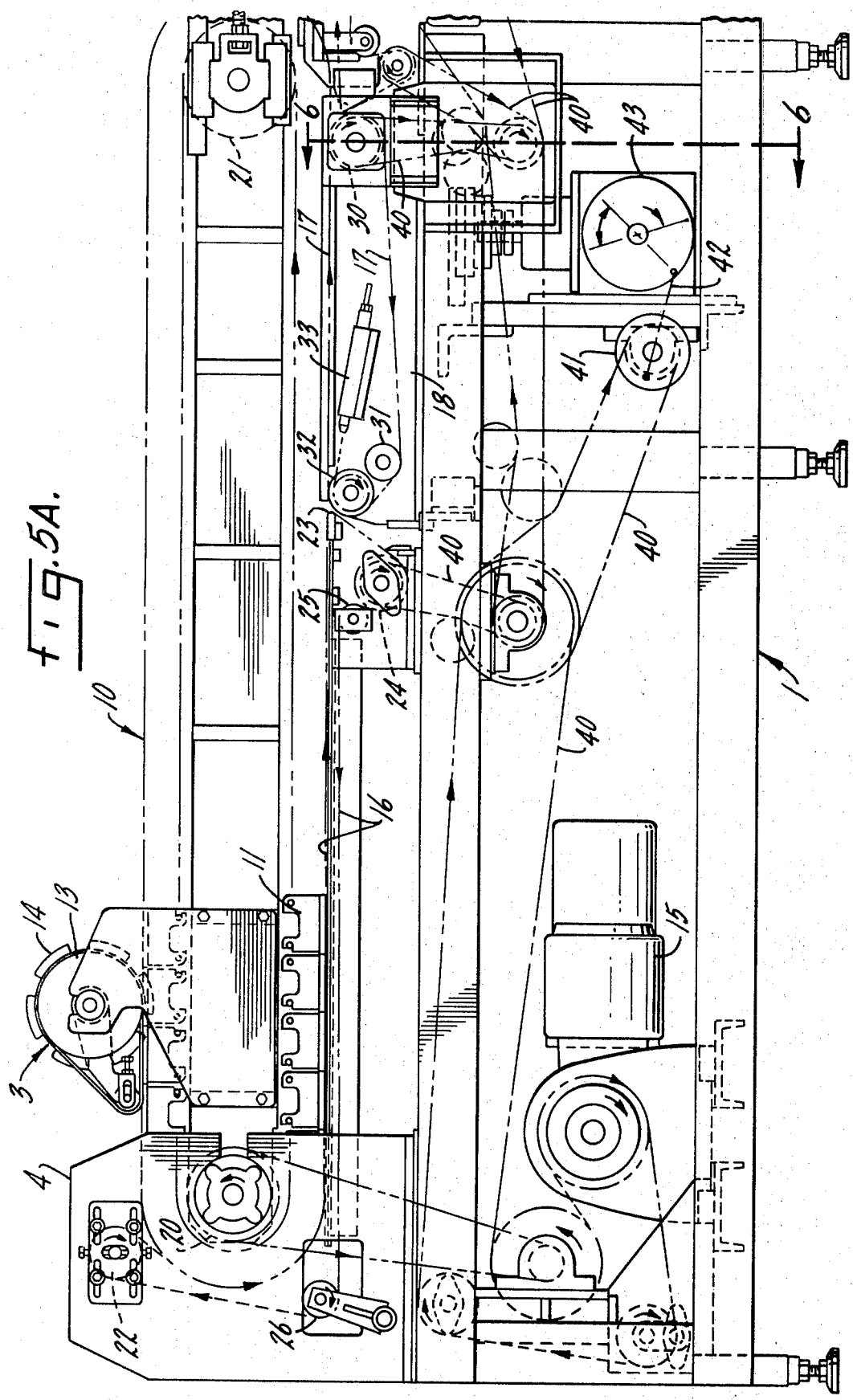

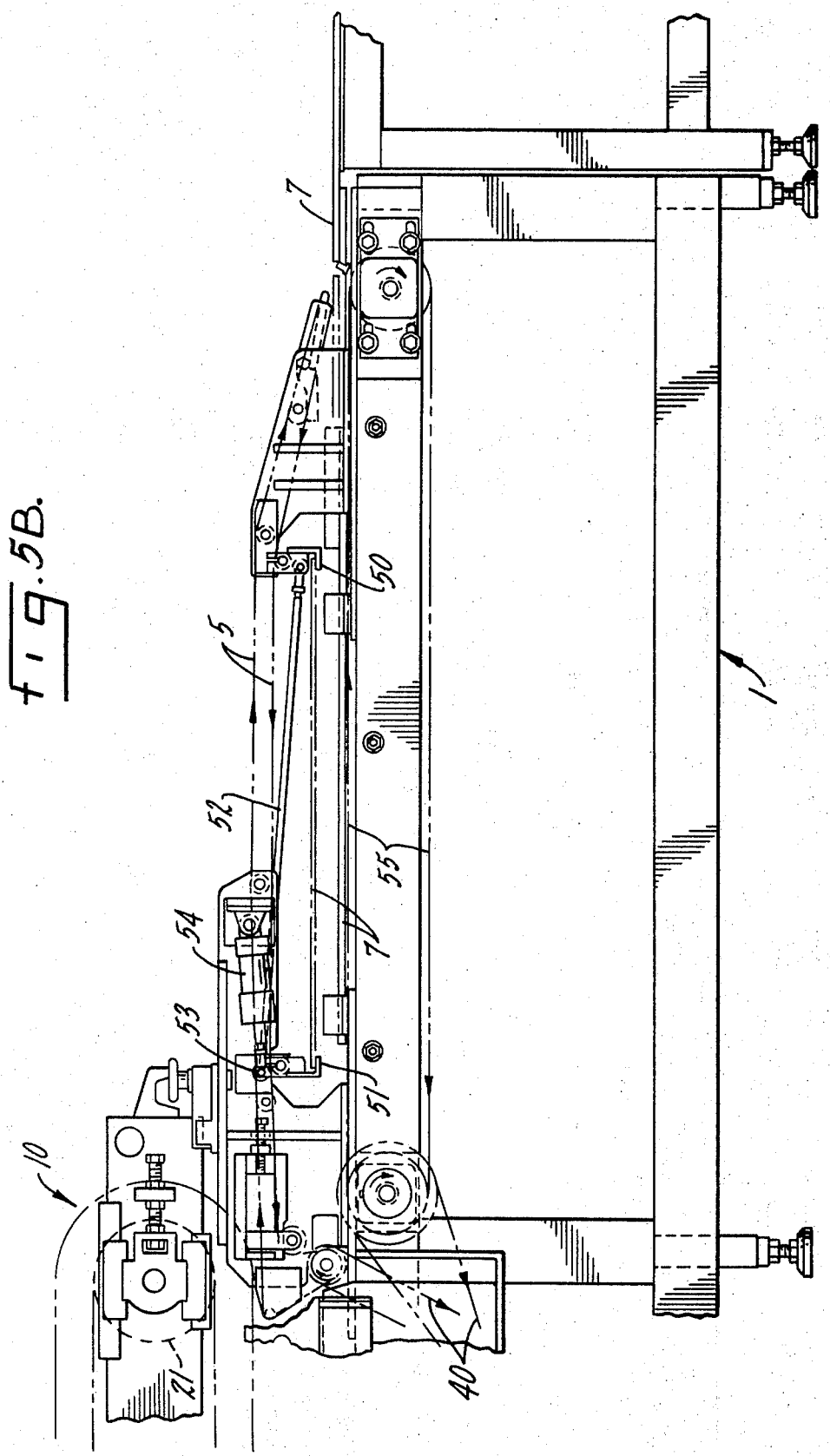

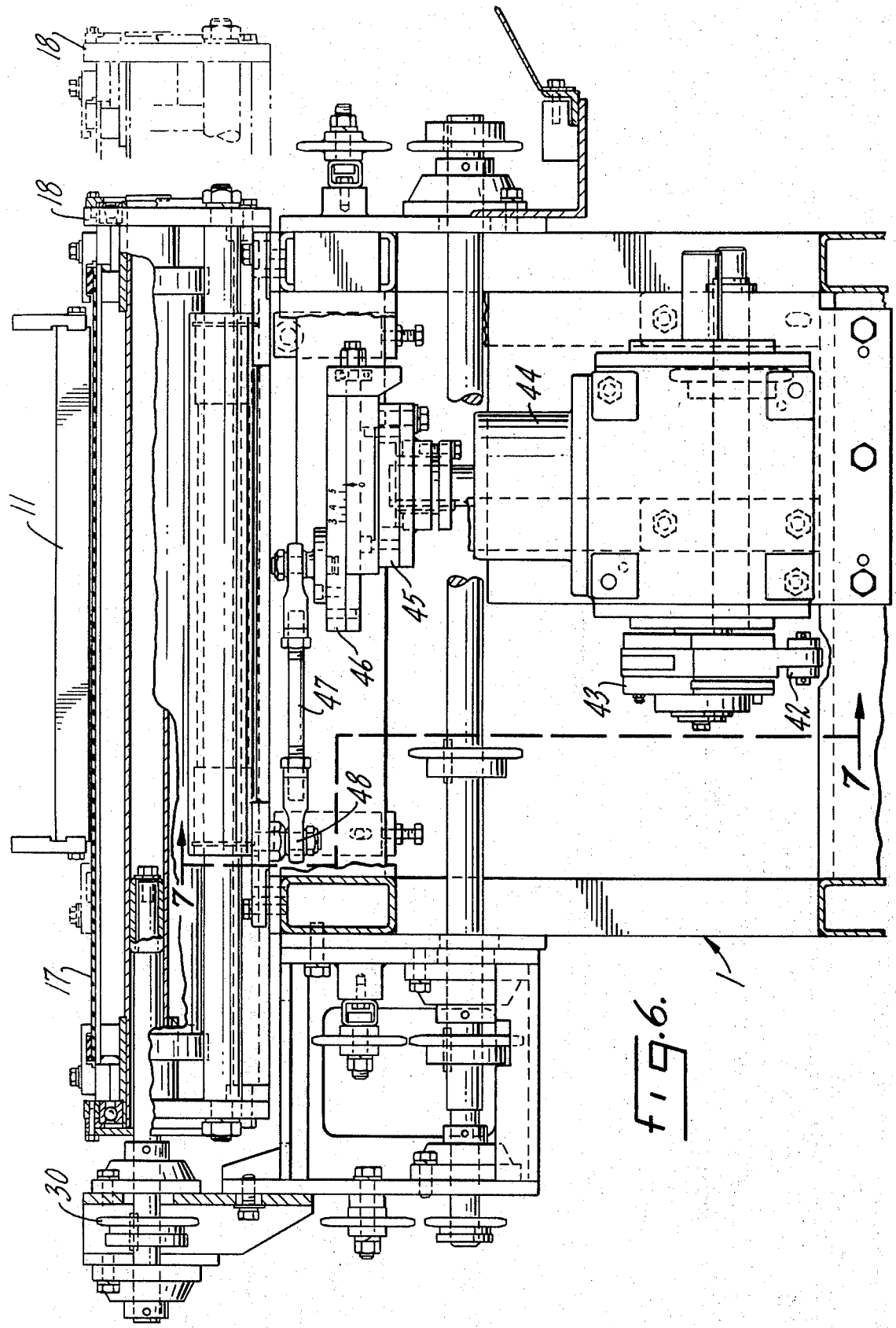

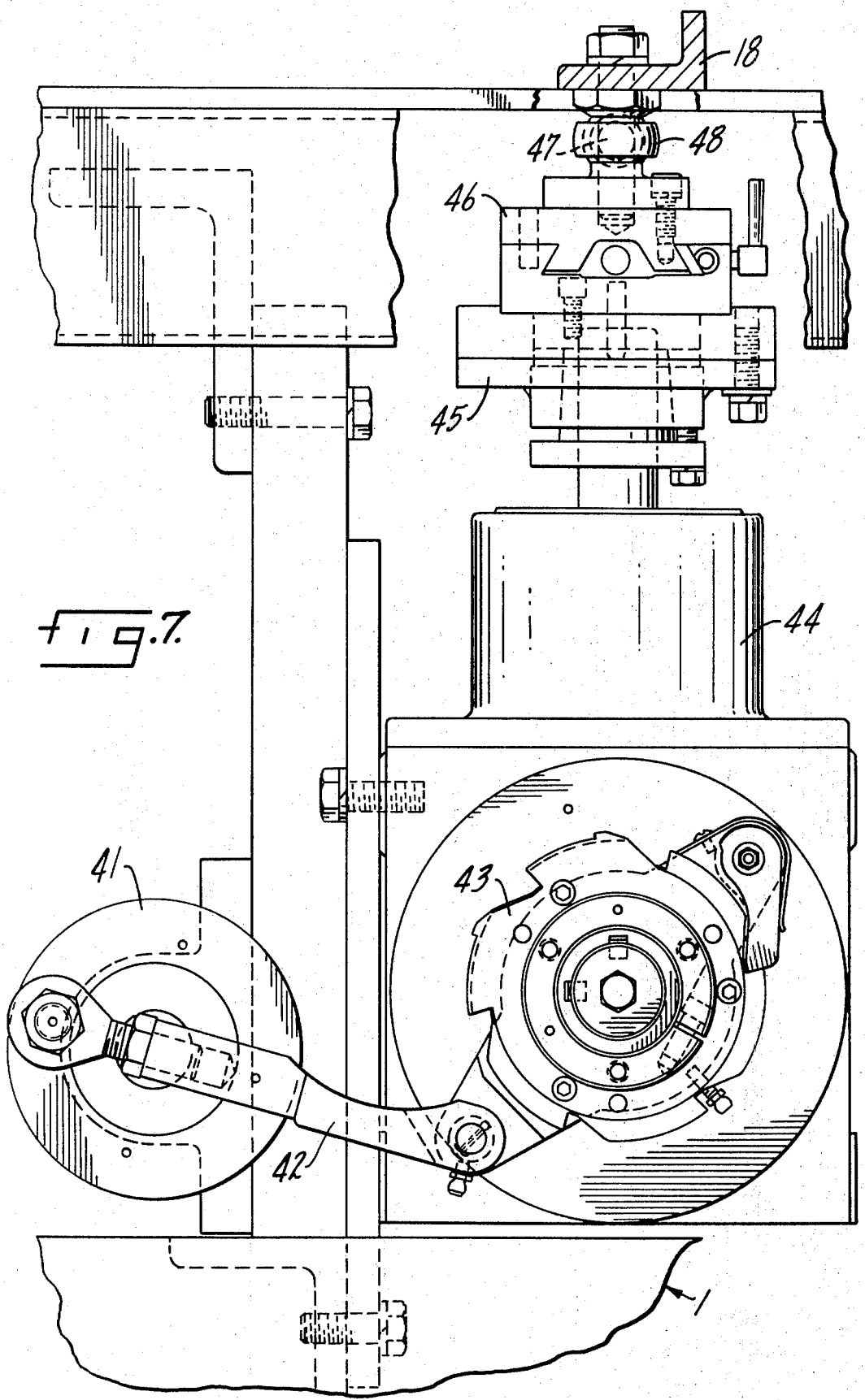

3,836,687
ROLL-FORMING PROCESS
Gay M. Bonebrake, Chicago, Ill., assignor to TAB
Engineers, Inc., Northbrook, Ill.
Filed Dec. 13, 1971, Ser. No. 207,318
Int. Cl. A21d 8/02
U.S. Cl. 426—496       3 Claims

ABSTRACT OF THE DISCLOSURE

Balls of dough are carried in inverted cup-shaped pockets and on a conveyor belt assembly, part of the belt assembly moving continuously longitudinally and intermittently reciprocated laterally to shape the balls into rolls. Portions of the belt assembly are moved at speeds differing from that of the pockets. The formed rolls are delivered to peel boards moved in timed relationship with the belt assembly.

SUMMARY OF THE INVENTION

This invention relates to a machine and process for forming egg-shaped bakery rolls and has as one of its purposes a machine and process for forming such rolls in uniform configuration.

Another purpose is to provide for increased rate of production of such rolls.

Another purpose is to provide for the formation of such rolls under more sanitary conditions.

Another purpose is to provide for substantial reduction of manual labor in the production of such rolls.

Another purpose is to provide egg-shaped bakery rolls having superior outer skin characteristics and appearance.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side elevation;
FIG. 2 is an end view;
FIG. 3 is a top plan view;
FIG. 4A is a detail view on an enlarged scale and illustrating a forming conveyor and a portion of a retaining belt conveyor;
FIG. 4B is a view similar to that of FIG. 4A and constitutes a continuation of the structure illustrated in FIG. 4A;
FIG. 5A is a side elevation on an enlarged scale and illustrating the parts within a portion of the structure shown in FIG. 1;
FIG. 5B is a view similar to that of FIG. 5A and illustrating a continuation of the structure shown in FIG. 5A;
FIG. 6 is a detail view taken on line 6—6 of FIG. 5A on an enlarged scale and illustrating the mechanism for moving the forming belt conveyor of the invention;
FIG. 7 is a view taken on the line 7—7 of FIG. 6; and
FIG. 8 is a schematic illustration of the operation of a portion of the machine of the invention.

Like parts are indicated by like numerals throughout the specification and drawings.

DESCRIPTION OF THE PREFERRED EMBODIMENT

Referring now to the drawings, and particularly to FIG. 1, a suitable frame 1 supports a loading station indicated generally at 2, a tamper device 3, a retainer belt end housing 4 and a delivery conveyor 5.

Laterally disposed to the run of frame 1, as illustrated in FIG. 2, is a conventional stacking and supplying structure 6 for delivery of peel boards 7 to the structure illustrated in FIG. 1.

As best seen in FIG. 3, a loading conveyor 10 is formed of individual flights 11 arranged in a continuous articulated belt, each of the flights 11 having spaced, outwardly open formed pockets 12 therein. Preferably, the pockets of adjacent flights are offset as shown in FIG. 3. The tamper structure 3 includes a drum 13 having rows of spaced finger elements 14 positioned for entry partially into the pockets 12 as the same move beneath the rotating drum 13. The entire conveyor structure 10–14 may be pivoted at its end within housing 4, the hook (not shown) being provided at its opposite end, to provide access to elements therebeneath on frame 1.

Referring now to FIG. 4A, illustrated therein is a portion of the structure, beneath the conveyor 10. A drive motor for the mechanism of the invention is illustrated at 15. A portion of the horizontal run of a continuous retaining belt is illustrated at 16. A continuous forming belt 17 runs on a reciprocal carriage 18 which is laterally movable with respect to the direction of movement of the upper and lower horizontal runs of belts 16, 17 as reflected by the phantom lines and arrows in FIG. 4A.

As may be best seen in FIG. 5A, loading conveyor 10 turns about end sprockets or rollers 20, 21. As the flights 11, after passing beneath the tamper 3, begin their excursion about the sprocket 20, their outwardly open pockets are presented to a corresponding curved run of the retaining belt 16 which has turned about an upper sprocket 22. The belt 16 rides with the flights 11 about the sprocket 20 and thereafter moves horizontally beneath the now downwardly open pockets 12 to the forward ledge 23 from whence the belt 16 moves about the rollers 24, 25 for its return run, where it turns about the roller 26 and thereafter rises to roller or sprocket 22.

The continuous belt 17 likewise turns about a forward roller 30 and a set of rear rollers 31, 32, the latter being adjustable by means of cylinder 33.

Suitable motion transmission devices, such as the continuous belts indicated by the numeral 40 are provided for transmitting the action of motor 15 to the belts 16, 17 and 5 and to an eccentric drive disc 41.

Referring now to FIGS. 6 and 7, the mechanism is illustrated for reciprocating the carriage 18. The eccentric 41 by means of link 42 drives ratchet wheel 43 which in turn, through gear box 44 and superstructure 45, rotates eccentric 46 connected by link 47 with carriage 18 as indicated at 48.

By reference to FIG. 5B, it will be observed that the peel boards 7 are delivered to a set of spaced supporting fingers or finger channels 50, 51, the fingers being pivotally supported at their upper ends and joined by a link structure 52, 53, the link structure being operable by means of a fluid motor such as the hydraulic cylinder shown at 54 to separate and thus to open the fingers 50, 51 and to permit a board 7 to drop from the phantom line position shown in FIG. 5B to the solid line position therebelow and onto a continuous conveyor belt 55. The peel boards 7 are delivered by conveyor 55 beneath the inclined end portion of roll delivery conveyor 5 for deposit of formed rolls from the conveyor 5 to the peel boards as the boards move beneath the forward edge of conveyor 5. Since the rolls were delivered by the forming conveyor, the pockets 12 being rotated upwardly away from the rolls, a pattern of roll placement is created on conveyor 5 as determined by the positioning of the pockets 12. The said pattern is thus delivered to the peel boards by conveyor 5.

It will be understood that suitable electrical controls (not shown) which are well known may be employed to insure timed operational relationships among all of the moving parts of the structure shown in FIGS. 1–7.

The use and operation of the invention are as follows:

Balls of dough or doughballs may conveniently be formed on a conventional Fortuna machine (not shown) for substantial uniformity of content, the doughball-forming machine constituting no part of the present invention. The doughballs are deposited at loading station 2 on top of conveyor 10 in a more or less random pattern, the loading operator shuffling the doughballs to place one doughball into each of the pockets 12 on the flights 11 as they rise into and traverse the upper run of conveyor 10. Normally all pockets 12 will be loaded with doughballs for maximum efficiency though the performance of the machine and process is not affected if an empty pocket occurs. Flour may be added to the surface of the doughballs at the Fortuna machine or at the loading conveyor, although the addition of flour is not considered necessary under normal conditions of dough preparation. Pockets 12 and the surface of flights 11 about the pockets are coated with a material, preferably Teflon, effective to limit sticking of dough thereto and belt 16 is formed of Teflon or similar material for the same reason.

As the loaded pockets pass beneath tamper structure 3, fingers 14 press the doughballs slightly to insure location of the doughballs entirely within the shaped pockets 12. It will be understood that the machine and process of the invention are illustrated as applicable to the formation of what are known as egg-shaped rolls in the trade. Hence the pockets are elliptical, having parallel forward and rear edges, concave side edges and curved inner walls. It will be further understood that the depth of the pockets and the quantity of dough in each doughball are predetermined to produce the size of egg-shaped roll desired.

After passing beneath the tamper 3, the flights 11 tilt downwardly to traverse the sprocket structure 20, the open pockets 12 substantially immediately meeting the downward curved run of retainer belt 16. As the flights 11 began their downward excursion, the doughballs were free to move by gravity toward the leading edge of their associated pockets 12, the doughballs being restrained from leaving the pocket by the leading edge wall of the pocket and by the retaining belt 16 with which the doughballs make contact. The relative motion of flights 11 as they traverse sprocket 20 is somewhat faster than that of the retaining belt portion with which they are in contact, hence the doughballs are urged rearwardly from the leading wall of the pocket 12 and toward the trailing wall thereof and entrapment or pinching of the doughball between the forward edge of its associated pocket and belt 16 is avoided.

Thereafter the flights 11, now inverted, and the retaining belt 16 move horizontally toward forming belt 17, the contoured pockets 12 thus forming the top and the retaining belt 16 forming the bottom of moving enclosures each containing a doughball therewithin and near the trailing edge walls thereof. During this horizontal movement the retaining belt is moving relatively faster than the flights 11 and pockets 12 and the doughballs are urged within the pockets 12 away from the trailing edge walls thereof and toward a position nearer the center of the pockets 12.

Retaining belt 16 is allowed some slack and a minor gap at the beginning of its horizontal run toward the forming belt 17, the gap being reduced as the retaining belt 16 and flights 11 approach forming belt 17 in order to insure against any pinching affect at the rear edges of the pockets 12 which might prevent the doughball from moving forward within its associated pocket 12.

The hard rolls comprising the object of the machine and process of the invention are soft inside and have a hard, thin skin. The skin of the roll, during its formation, is, in fact, stretched in order to produce the thin, hard, brittle characteristic desired in the baked finished roll. Machines and processes which merely shape the roll in the desired configuration result in a tough skin which must be pulled apart and which is not broken apart like the hard roll characteristics desired. In proofing or rising after the operation of the machine and completion of the process of the invention, the skin of the roll stretches even more and the formed roll is therefore cut or sliced before baking, leaving an opening in the skin of the finished roll with striations or lines and having the appearance of a membrane stretched over the opening. To achieve this desirable finished product, therefore, the stretching of the outer layer or "skin" of the roll in its original forming is of critical importance.

Manual formation of the rolls constituting the object of the present invention has been achieved by trained workers who roll the doughballs by hand on a stationary table. While the desired skin stretch and formation may thus be approached, the volume of production is substantially limited, uniformity of product is virtually impossible and the cost of manufacture is substantial.

The forming belt 17 is formed of an endless length of a material capable of providing sufficient friction to cause the doughball to roll rather than slide when worked upon by the belt 17. While other materials may prove useful, canvas has been found fully adequate and is preferred as the material of the belt 17. In addition to the friction characteristic desired in the belt 17, the same must have release properties insuring that the doughball will not adhere to the belt or slip or extrude under the edge of its associated pocket 12 and insuring that the formed roll will not adhere to the belt at the point of transfer from the forming belt 17 onto the delivery belt 5.

It will be understood that forming belt 17 is driven continuously through its upper run as a continuation of and in the same direction as the upper run of the retaining belt 16 and the lower run of the conveyor 10, the conveyor 10 extending over substantially the full length of the upper runs of belts 16 and 17. The forming belt 17 is, however, driven at a constant speed slightly greater than that of conveyor 10 to position the doughball at the optimum position for imparting the desired egg shape and to place the formed roll at the forward end of its associated forming pocket 12 to facilitate its transfer to the delivery belt 5.

Forming belt 17, while continuously moving in the longitudinal direction of and beneath the conveyor 10, is moved laterally with its carriage 18. As may be best represented schematically in FIG. 8, the forming belt 17 moves longitudinally between a series of "dwell positions" when no lateral movement occurs. A first dwell period provides for secure contact of the doughball with belt 17. Thereafter, each lateral movement consists of a movement of carriage 18 to one side and an immediate return, over a shorter distance, at which point a dwell period occurs. Thereafter, a lateral movement of carriage 18 takes it to the opposite side and immediately returns it partially therefrom, at which point another dwell period occurs, and so on. During all lateral movements, belt 17 continues its longitudinal movement with the inverted pockets 12, the sideways movement and partial return of belt 17, repeated three or as many times as desired for each roll, insures a spreading of the area of belt 17 contacting the doughballs and thus limits buildup of dough on particular areas of belt 17.

The means and method of the invention results in a rapid, high volume formation, from units, such as balls or discs of dough, of uniform rolls having the desired "egg" shape and an outer layer or "skin" which has been stretched and smoothed over its entire length and over its entire, curved upper portion. After cutting, as above described, and baking, the finished roll exhibits the desired appearance and the brittle, thin, breakable skin or eggshell like crust desired.

The embodiments of the invention in which an exclusive property or privilege is claimed are defined as follows:

1. A method for processing unbaked dough masses to obtain egg-shaped dough masses having uniformly stretched skins, including the steps of:

supporting dough masses on a moving belt, which belt has surface frictional characteristics which will cause the dough masses to roll rather than slide when worked upon by the belt, positioning an inverted container over each dough mass with each of said containers having walls which, at least partially, surround and engage its dough mass, moving said belt and said inverted containers continuously in a direction longitudinally of the belt to move said dough masses along inside said containers, and intermittently moving said belt reciprocally laterally relative to said inverted containers, thereby pulling a portion of each dough mass laterally relative to its inverted container to uniformly stretch the outer skins of said dough masses.

2. The method of claim 1 in which said belt is first reciprocated in one lateral direction and then, after a dwell period, said belt is reciprocated in the opposite lateral direction.

3. The method of claim 1 in which the longitudinal movement of said belt is at a slightly greater speed than longitudinal movement of said inverted containers.

References Cited
UNITED STATES PATENTS 3,146,730   12/1964   White _____ 99—90

JAMES R. HOFFMAN, Primary Examiner